(No Model.)
J. G. HEMESATH.
VEGETABLE REDUCER.
No. 498,262. Patented May 30, 1893.
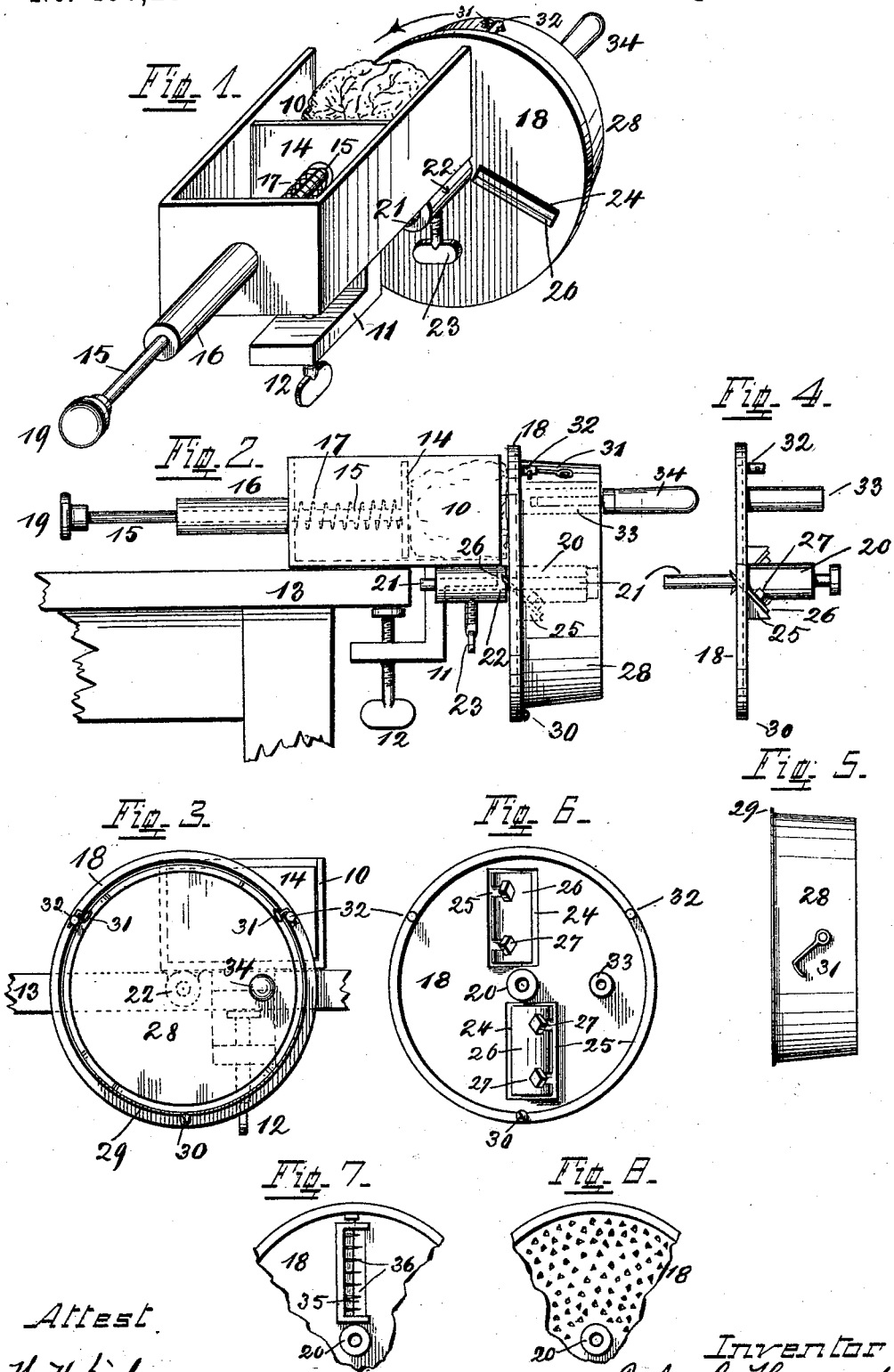
Attest
W. H. Dicks.
Harry Byrne.
Inventor
John G. Hemesath
by Chas. Spengel Atty.
THE NORRIS PETERS CO., PHOTO-LITHO., WASHINGTON, D. C.

UNITED STATES PATENT OFFICE.

JOHN G. HEMESATH, OF COVINGTON, KENTUCKY.

VEGETABLE-REDUCER.

SPECIFICATION forming part of Letters Patent No. 498,262, dated May 30, 1893.

Application filed August 4, 1892. Serial No. 442,107. (No model.)

*To all whom it may concern:*

Be it known that I, JOHN G. HEMESATH, a citizen of the United States, residing at Covington, in the county of Kenton and State of Kentucky, have invented certain new and useful Improvements in Vegetable-Reducers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a device for reducing vegetables and similar objects to slices, or smaller particles to suit the requirements of different culinary purposes.

It consists substantially of a receptacle which carries a rotary cutter-head and the novelty consists in the specific construction of the different parts, and in the manner whereby they are connected, and it further consists in combining with the rotary cutter-head a round receiver, provided with means to attach it and into which the reduced vegetables drop and which in form corresponds substantially with the cutter-head.

In the following specification and claims is found a full description of the device, its parts and construction, which latter is illustrated in the accompanying drawings, in which—

Figure 1, is a perspective view of the device complete. Fig. 2, is a side-view of the same, showing it attached to a table. Fig. 3, is an end-view of Fig. 2. Fig. 4, is a side-view of the cutter-head detached and Fig. 5, is a similar view of the receiver detached. Fig. 6, is a view of the cutter-head as it appears when the receiver is detached from it and Figs. 7, and 8, are fractional views similar to the preceding figure, showing different reducing devices attached to the cutter-head.

10, is a rectangular box or receiver, open at its top and one end and provided with a clamp 11, and screw 12, by which the device is attached in a suitable manner, preferably to the projecting edge of a table-top 13. It is provided with a follower 14, guided by a stem 15 in a sleeve 16, which with the aid of a spring 17, forces the object to be reduced and contained in the receiver toward the open end of the latter and against the cutter-head 18, part of which reaches across the open end of the receiver.

19, is a knob at the end of stem 15, by which the follower may be pulled back to permit the insertion of the vegetables between it and the cutter-head. This knob also forms a stop against the forward action of spring 17, against follower 14, and prevents the latter from becoming disengaged by being pushed out through the open end of the feed-receiver in cases where cutter-head 18, is not in position to prevent such.

The cutter-head 18, consists substantially of a circular disk provided with a central boss 20, through which a pin 21, passes which enters a bearing 22, on the lower side of the feed-receiver and thus forms the pivotal support for the cutter-head. A screw 23, impinging against pin 21, holds the cutter-head in place and also permits its ready detachment. The cutter-head is slotted as shown at 24, and provided with the inclined knife-beds 25, to one side of each of the slots and running parallel with the latter.

26, are the knives secured by bolts 27, to the knife-beds and reach through the slots in the cutter-head, projecting beyond the latter, which projection is adjustable to suit the size of the cut desired. The knives clear the end of the feed-receiver by reason of bearing 22, which projects beyond the latter and prevents cutter-head 18, from coming too close up against this end of the feed-receiver.

28, is another receiver secured to the outside of the cutter-head and receives the reduced vegetables as they discharge through the slots adjacent to the knives. This discharge-receiver is removably secured to the cutterhead by a flange 29, on its rim, which engages with the head of a screw or similar projection 30, on the cutter-head and by hooks 31, which engage with holes in pins 32, also secured to the cutter-head.

33, is another boss, the opening in the end of which registers with a hole in the bottom of the discharge-receiver, through and into which a crank-handle 34, is inserted for the purpose of rotating the cutter-head with the discharge-receiver.

The device is operated when the parts are in positions as shown in Figs. 1, and 2. The feed-receiver is supplied by pulling follower 14, back by means of its knob 19, after which the vegetables to be reduced are put in their proper position between the follower and cutter-head. As the vegetable is being reduced by the cutter-head, it is kept on feeding toward the latter by the action of the spring-impelled follower. The reduced vegetable is obtained by removing the discharge-receiver from the cutter-head which is done by disengaging hooks 31, from pins 32, after which said receiver becomes liberated and may be taken off of the projection 30, crank-handle 34, having been slipped out first. For purposes of cleaning, or when not in use, cutter-head 18, may be taken off by loosening screw 23, which releases pin 21, upon which the former revolves. When a reduction smaller than slices is required, additional slots 35, and knives 36, cutting at right angles to knives 26, are provided as shown in Fig. 7. For grating, a cutter-head as shown in Fig. 8, may be used.

Having described my invention, I claim as new—

1. In a rotary vegetable reducer, the combination with the circular cutter-head or knife-holder thereof, of a round receiver which receives the reduced vegetables and in form corresponds substantially with the cutter-head and means connecting this receiver to the cutter-head, all as substantially shown and described.

2. In a device of the kind described, the combination of a feed-mechanism, a bearing 22, secured to it, a pin 21, fitting said bearing, a screw holding it in position within the latter, a cutter-head having a perforated boss which fits pin 21, and revolves thereon and a discharge-receiver removably connected to the cutter-head, all as substantially shown and described.

3. In a device of the kind described, the combination of a feed-mechanism, a rotary cutter-head supported thereon, a projection 30, and pins 32, secured to the latter, and a discharge-receiver having a flange 29, and hooks 31, which when engaging with projection 30, and pins 32, serve to secure the discharge-receiver to the cutter-head, all as substantially shown and described.

4. In a device of the kind described, the combination of a feed-mechanism, a rotary cutter-head supported thereon, a discharge-receiver removably connected to the cutter-head, a boss 33, secured to the cutter-head, a hole in the bottom of the discharge-receiver registering with the hole in the end of this boss and a crank-handle 34, passing through the hole in the discharge-receiver and fitting the hole in boss 33, all as substantially shown and described.

5. In a rotary vegetable reducer, the combination of a feed-receiver and mechanism, a clamping-device 11, 12, and bearing 22, both rigidly connected to the former, a cutter-head 18, a pivot-pin 21, passing through it and entering bearing 22, and means to hold said pin in position within its bearing, all as substantially shown and described.

In testimony whereof I affix my signature in presence of two witnesses.

JOHN G. HEMESATH.

Witnesses:
  W. H. DICKS,
  C. SPENGEL.